United States Patent
Weber

(10) Patent No.: US 7,995,608 B2
(45) Date of Patent: Aug. 9, 2011

(54) METHOD FOR AUTOMATICALLY SETTING UP DATA CONNECTIONS BETWEEN NETWORK SUBSCRIBER STATIONS IN A NETWORK OF DISTRIBUTED STATIONS, AND NETWORK SUBSCRIBER STATIONS AS A USER INTERFACE APPLIANCE FOR CARRYING OUT THE METHOD

(75) Inventor: Michael Weber, Hannover (DE)

(73) Assignee: Thomson Licensing, Boulogne-Billancourt (FR)

( * ) Notice: Subject to any disclaimer, the term of this patent is extended or adjusted under 35 U.S.C. 154(b) by 484 days.

(21) Appl. No.: 10/583,594

(22) PCT Filed: Dec. 10, 2004

(86) PCT No.: PCT/EP2004/014055
§ 371 (c)(1),
(2), (4) Date: Jun. 19, 2006

(87) PCT Pub. No.: WO2005/060163
PCT Pub. Date: Jun. 30, 2005

(65) Prior Publication Data
US 2007/0162618 A1    Jul. 12, 2007

(30) Foreign Application Priority Data
Dec. 19, 2003   (DE) .................. 103 60 416

(51) Int. Cl.
*H04L 12/66* (2006.01)
(52) U.S. Cl. ........................ 370/463; 386/326
(58) Field of Classification Search .......... 370/463; 710/305; 709/328; 386/46, 96
See application file for complete search history.

(56) References Cited

U.S. PATENT DOCUMENTS

| | | | |
|---|---|---|---|
| 5,291,343 A * | 3/1994 | Goto | 386/96 |
| 6,021,433 A | 2/2000 | Payne et al. | |
| 6,169,725 B1 | 1/2001 | Gibbs et al. | |
| 6,618,764 B1 | 9/2003 | Shteyn | |

(Continued)

FOREIGN PATENT DOCUMENTS
WO    02/091114 A2    11/2002

OTHER PUBLICATIONS
Search Report Dated Apr. 8, 2005.

(Continued)

*Primary Examiner* — Albert T Chou
(74) *Attorney, Agent, or Firm* — Robert D. Shedd; Vincent E. Duffy; Joel M. Fogelson

(57) ABSTRACT

The invention relates to the technical field of data communication in a network of distributed stations, particularly in a home network. A home network of this type allows AV data streams to be transmitted between network subscriber stations. The aim of the invention is to assist the user of a network of this type when he wishes to start a recording procedure for the audio and/or video data. In line with the invention, a data connection is automatically set up between that data source appliance which has already set up a connection to a data sink appliance or to a user interface appliance and the recording appliance. The automatic set-up of a data connection takes place directly after the user interface for the recording appliance has been called up. Alternatively, the automatic set-up of a data connection may take place only specifically after selection of the recording function on the recording appliance. The measure assists the implementation of an instant-recording function on the recording appliance in the network.

10 Claims, 5 Drawing Sheets

U.S. PATENT DOCUMENTS

| | | | |
|---|---|---|---|
| 6,985,669 B1 * | 1/2006 | Unger | 386/46 |
| 7,257,821 B2 * | 8/2007 | Wendorf et al. | 719/328 |
| 2002/0078293 A1 * | 6/2002 | Kou et al. | 710/305 |

OTHER PUBLICATIONS

Anonymous, "IEEE Standard for a High Performance Serial Bus", The Institute of Electrical And Electronics Engineers, IEEE Std 1394, pp. 1-188 (Part 1 of 2), Dec. 12, 1995, New York, NY.

Anonymous, "IEEE Standard for a High Performance Serial Bus", The Institute of Electrical And Electronics Engineers, IEEE Std 1394, pp. 189-392 (Part 2 of 2), Dec. 12, 1995, New York, NY.

Anonymous, "IEEE Standard for a High-Performance Serial Bus-Amendment 2", The Institute of Electrical And Electronics Engineers, IEEE Std 1394b, pp. 1-374, Dec. 14, 2002, New York, NY.

* cited by examiner

METHOD FOR AUTOMATICALLY SETTING UP DATA CONNECTIONS BETWEEN NETWORK SUBSCRIBER STATIONS IN A NETWORK OF DISTRIBUTED STATIONS, AND NETWORK SUBSCRIBER STATIONS AS A USER INTERFACE APPLIANCE FOR CARRYING OUT THE METHOD

This application claims the benefit, under 35 U.S.C. §365 of International Application PCT/EP04/014055, filed Dec. 10, 2004, which was published in accordance with PCT Article 21(2) on Jun. 30, 2005 in English and which claims the benefit of German patent application No. 10360416.2, filed Dec. 19, 2003.

The invention relates to the technical field of data communication in a network of distributed stations, particularly a home network. This particularly includes the field of automatic connection set-up between network subscriber stations.

BACKGROUND OF THE INVENTION

There are now various home network standards available for networking appliances in the field of the home. In the field of consumer electronics, the bus standard IEEE-1394 has become established, in particular. This allows communication between the consumer electronics appliances at a very high data rate. Data rates of 100, 200 and 400 Mbit/s are supported. In the meantime, the original standard IEEE-1394-1995 has been extended and the current version IEEE-1394b specifies even higher data transmission speeds S800, S1200 and S1600. This is sufficient to transmit both asynchronous data packets for controlling the network subscriber stations (subsequently called network stations for short) and isochronous audio and video data streams in parallel. The typical application for data interchange between consumer electronics appliances involves a title, either a video film or a piece of music, being played back from a video or audio data source, and the associated data stream being transmitted to a further consumer electronics appliance. For this instance of application, a logical data connection is set up between the appliances in question, which interchange data with one another. This data connection is then used for transmitting data packets on a regular basis. This form of data transmission is referred to in the IEEE-1394-1995 standard as isochronous data transmission, which involves data packets being transmitted from the data source to the data sink or data sinks on a regular basis, at particular intervals of time.

In addition, asynchronous data transmission also takes place in the IEEE-1394 network. In this case, data packets are sent as required, so to speak. The quantity of such asynchronous data packets which is sent via the bus is dependent on the volume of data which arises. Asynchronous data transmission is used predominantly for identifying and controlling an appliance in the network using another appliance which is present in the network.

However, the IEEE-1394-1995 standard specifies only the bottom layers of the ISO/OSI reference model for data communication, namely the physical layer, the data link layer and parts of the network layer. The higher layers, namely the transport layer, the session layer, the presentation layer and the application layer, are unspecified, however.

A consortium of consumer electronics companies has set about also defining the higher layers for data interchange between the consumer electronics appliances. This standard is known by the acronym HAVi, where HAVi stands for Home Audio/Video interoperability. This standard specifies "interoperability middleware", which ensures that products from various manufacturers understand one another, i.e. cooperate with one another, in order to perform tasks via the network together.

As mentioned, the typical instance of application for the network of consumer electronics appliances involves a data source appliance sending AV data, that is to say audio or video data, to one or more other consumer electronics appliances. The target appliances are typically referred to as a data sink appliance. The user wishes to be able to select directly that appliance from which he wishes to send data and that appliance to which the data need to be delivered within the network. This selection of the appliances needs to be as convenient as possible for the user. To this end, the user interface known from computer technology is used very frequently today. A user interface comprises one or more operating menus (which can be shown on a display unit) in which the user can use either a mouse pointer or keys on the remote control (particularly cursor control keys) to select individual menu items directly and can make particular inputs using the keypad.

To set up a logical data connection between two network stations, it is possible for the user to select the data source appliance and the data sink appliance directly. Only after this selection is the data connection set up and is it possible for an audio and/or video data stream to be transmitted via this data connection. One example mentioned is where a user wishes to forward the AV data received via a digital set-top box to a television in order to be able to view and listen to the video programme on the television. To do this, the user would need to select both appliances directly. If the AV data are now likewise also intended to be recorded by a recording appliance, then the user would need to select the data source appliance and the data target appliance (that is to say the recording appliance) again and start the recording function.

INVENTION

It is an aim of the invention to assist the user in the procedure of setting up data connections for recording. In line with the invention, this is done by virtue of a logical data connection from that data source appliance which already has a data connection which has been set up to a data sink appliance anyway being set up to the recording appliance in standard fashion.

A typical instance of application is where the data sink appliance matches the display appliance on which the user interface for controlling the recording appliance is being shown (user interface appliance in the claims). In that case, a suitable data source appliance is the aforementioned digital set-top box, for example, which provides the AV data for a television programme. In this context, immediately setting up the data connection between the set-top box and the recording appliance assists in the implementation of an instant-recording function on the recording appliance. The user often wishes to be able to record what he is currently viewing as a television programme on the display appliance as quickly as possible without any great complication, because it is currently of interest to him. In this case, the user merely needs to call up the user interface for the recording appliance, e.g. from the main menu, whereupon the data connection between the set-top box and the recording appliance would be set up. This can be displayed in the user interface for the recording appliance. The user then merely needs to select the recording function in order to start the recording procedure.

A further typical instance of application is where a data connection has already been set up between an audio source appliance, e.g. a CD player, and an audio data sink appliance, e.g. an amplifier device for audio signals, in a network. If the user now selects the user interface for a recording appliance for digital audio signals, the invention sets up a data connection between the audio data source appliance and the audio recording appliance in standard fashion. It is thus assumed, in standard fashion, that the user wishes to record the audio data stream coming from the data source and currently also already being output over the loudspeakers. Again, the user does not need to make any direct selection for the data source appliance and the data sink appliance if the data connection which has been set up in standard fashion actually corresponds to his recording need. In this case, too, the inventive measure serves not only to make operation more convenient in the network, but also to assist in the implementation of an instant-recording function in addition.

The dependent claims contain further advantageous measures and improvements of the inventive method and of the inventive network subscriber station. By way of example, it is possible to set up the connection between the data source appliance and the recording appliance only after the user has activated the recording function on the recording appliance. This prevents superfluous data connections from being set up when the user does not wish to set up a data connection in standard fashion. On the other hand, the recording would be started a little later, which does not exactly support the instant-recording function.

DRAWINGS

Exemplary embodiments of the invention are illustrated in the drawings and are explained in more detail in the description below. In the drawings.

DESCRIPTION OF THE INVENTION

Figure 1:
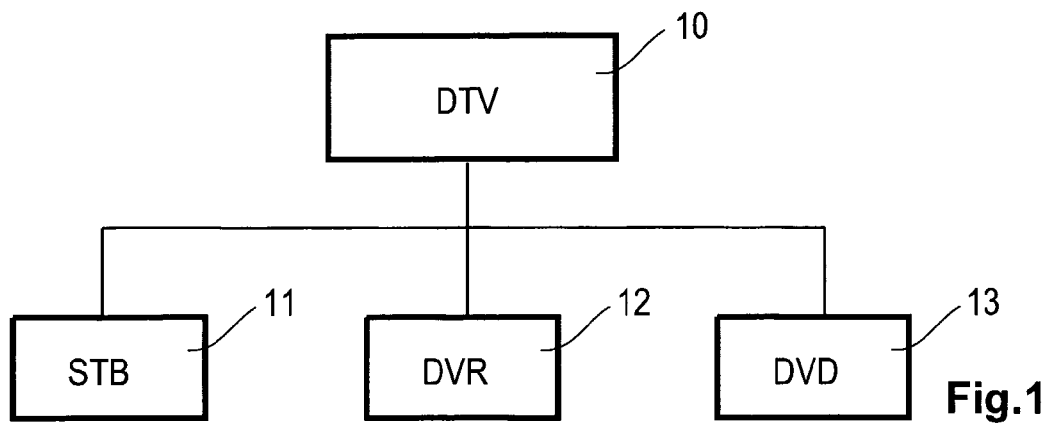
FIG. 1 shows a first example of a home network.

FIG. 1 schematically shows an example of a home network. The reference numeral 10 denotes a digital TV set. This may be a commercially available television with a digital video input. The reference numeral 11 denotes a set-top box. This receives digital television signals either by satellite or terrestrially or via the broadband cable. The reference numeral 12 denotes a digital video recorder. Various appliance types are suitable as a video recorder. First, it may be a "DVHS recorder", which records the digital video signals onto tape. Secondly, it may also be a DVD recorder, which records the digital video signals onto an optical storage disc. It may also be an "HDD recorder", which contains a hard disk and records the digital video data onto that. The reference numeral 13 denotes a DVD player. FIG. 1 shows that all of the appliances are connected to one another by means of a common bus connection. An example of a bus connection is the IEEE-1394 bus system. In accordance with this bus system, however, the specific network topology may turn out to be different than that shown in FIG. 1. The bus topology permitted in the IEEE-1394-1995 standard is based on a tree structure.

Figure 2:
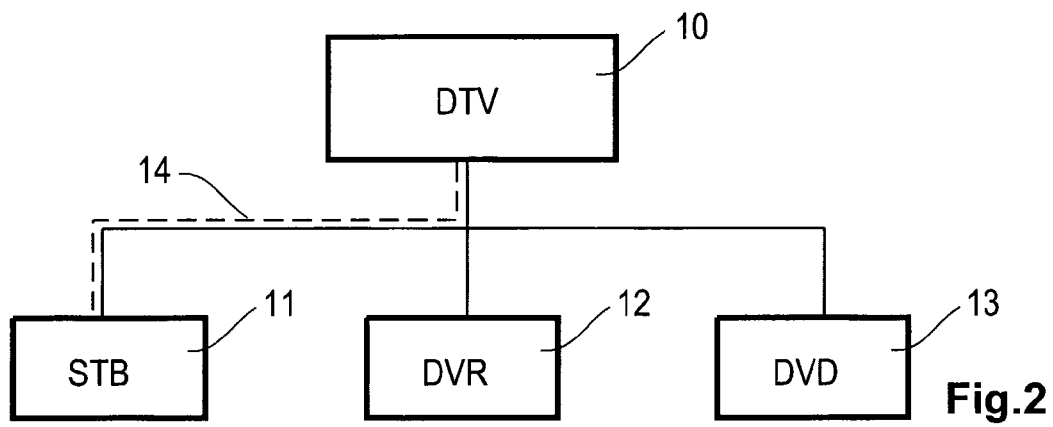
FIG. 2 shows the home network shown in FIG. 1 with a data connection which has been set up.

FIG. 2 shows the same network as in FIG. 1, but with a data connection having been set up between the set-top box 11 and the digital TV set 10. FIG. 2 thus shows the instance of application where the user is viewing a television programme on the digital TV set 10. To this end, he had set up a data connection 14 between the set-top box 11 and the television 10.

Figure 3:
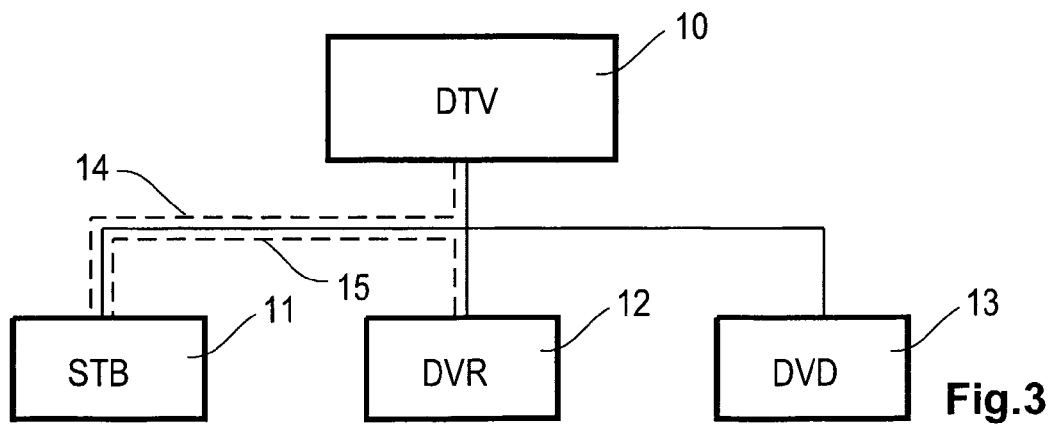
FIG. 3 shows the home network shown in FIG. 2 with a data connection which has been set up between the data source appliance and the recording appliance.

FIG. 3 shows the same network after a further data connection has been set up. The situation corresponds to the instance of application where the user wishes not only to view the current television programme which is being received via the set-top box 11 but also to record it on the digital video recorder at the same time. To this end, a further data connection 15 has been set up between the set-top box 11 and the digital video recorder 12.

The text below gives a more detailed illustration of how the data connection 15 can be automatically set up in convenient fashion for the user in line with the invention.

Figure 4:
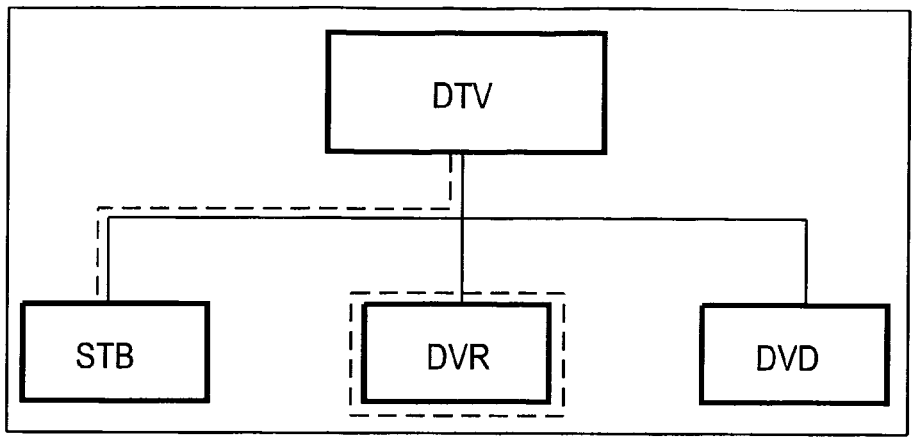
FIG. 4 shows the main menu on a user interface for controlling the network stations.

To this end, FIG. 4 first of all shows the main menu for operating the appliances in the network. In this context, FIG. 4 shows the picture which is output on the video display of the digital TV set 10, showing the network structure. The picture being shown likewise shows what current data connections have been set up at present in the network. In FIG. 4, a dashed line indicates that a data connection between the set-top box and the digital television is currently set up. To clarify the flow of data from the set-top box to the digital TV set, the illustration may be in animated form, i.e. for example a flow of data from the set-top box to the digital TV set is shown, for example by virtue of the dashed lines moving from the set-top box to the digital TV set. The dashed border around the digital video recorder is intended to indicate that the user requests control of the digital video recorder in the main menu. He may do this using cursor control keys, for example, which he can use to move a pointer in steps on the screen. The dashed border around the digital video recorder indicates that the latter is highlighted, as an indication that the current selection of the appliances refers to the digital video recorder. By pressing the confirmation key (OK key), the user can call up the operating menu for the digital video recorder.

Figure 5:
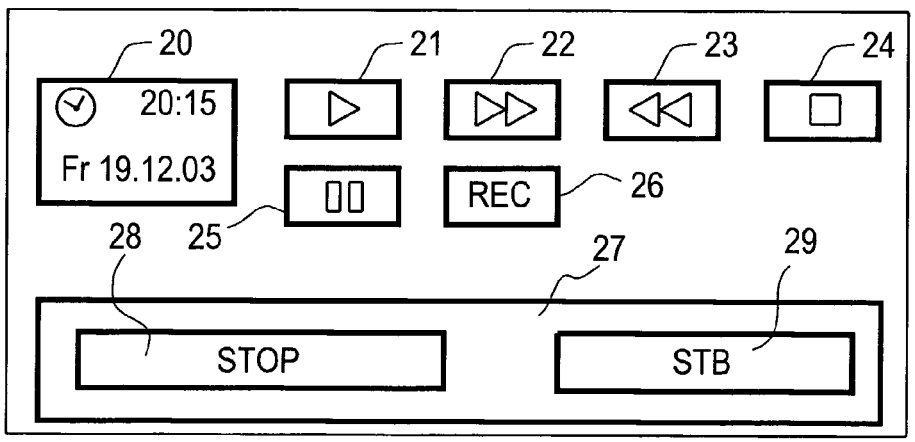
FIG. 5 shows the user interface for controlling the recording appliance based on a first exemplary embodiment of the invention.

FIG. 5 shows the operating menu for the digital video recorder after it has been called up. This is equivalent to a graphical user interface (UI) for controlling the digital video recorder. The reference numeral 20 denotes a display field for outputting the time and the current date. The reference numeral 21 denotes a representation for the playback key. The reference numeral 22 denotes a representation for the fast-forward key and the reference numeral 23 denotes a representation for the rewind key. Reference numeral 24 denotes a representation for the stop key. A representation for the pause key is provided with the reference numeral 25. The reference numeral 26 denotes a representation for the record key. The reference numeral 27 denotes a display field for the current operating state of the appliance. This display field contains a display field 28 for outputting the playing time of a current film title. The reference numeral 29 denotes a display field which contains a list of further appliances to which a data connection has been set up. As FIG. 5 shows, after the user interface for the digital video recorder has been called up, the display field 29 indicates that there is a connection to the set-top box, and the display field 28 outputs that there is currently no film title being played back or recorded. The word STOP is shown in the display field 28 in order to indicate that the recording appliance is in a standby state. Hence, when the user interface for the digital video recorder has been called up, an additional connection is automatically set up to the set-top box 11. The user can then start instant recording by selecting the representation for the record key 26.

Figure 6:
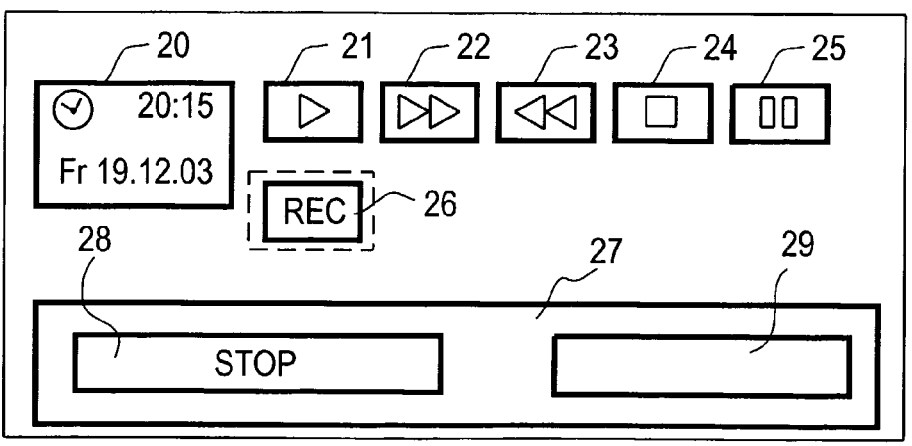
FIG. 6 shows the user interface for controlling the recording appliance in the initial state based on a second exemplary embodiment of the invention.

FIG. 6 again shows the user interface for controlling the digital video recorder directly after it has been called up. In this case, a data connection has not yet been set up directly, as shown in the display field 29 for the existing data connections. The digital video recorder is likewise in the standby state. If the user now starts the instant-recording function by selecting the representation for the record key, the connection to the data source appliance on the existing data connection 14 is automatically set up in the network, in line with this second exemplary embodiment of the invention. In FIG. 6, the selection of the representation 26 for the record key is indicated by a dashed border.

Figure 7:
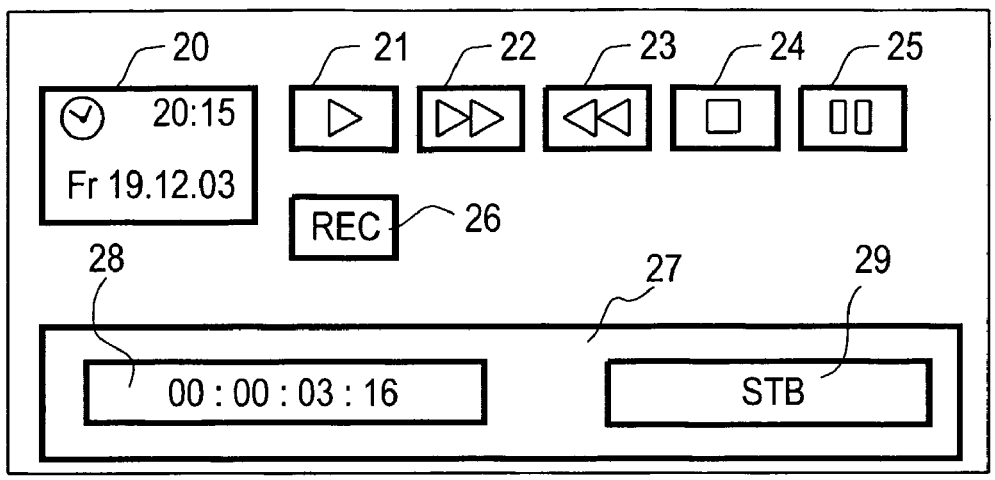
FIG. 7 shows the user interface for controlling the recording appliance following automatic data connection set-up based on the second exemplary embodiment of the invention.

FIG. 7 now shows the state after selection of this instant-recording function. This figure shows that the set-top box 11 has been entered in the display field 29 for the data connections. Hence, in this case, the automatic connection set-up has not taken place until after selection of the recording function. The display field 28 for the current playing time shows that more than 3 seconds of the current television programme have already been recorded.

Figure 8:
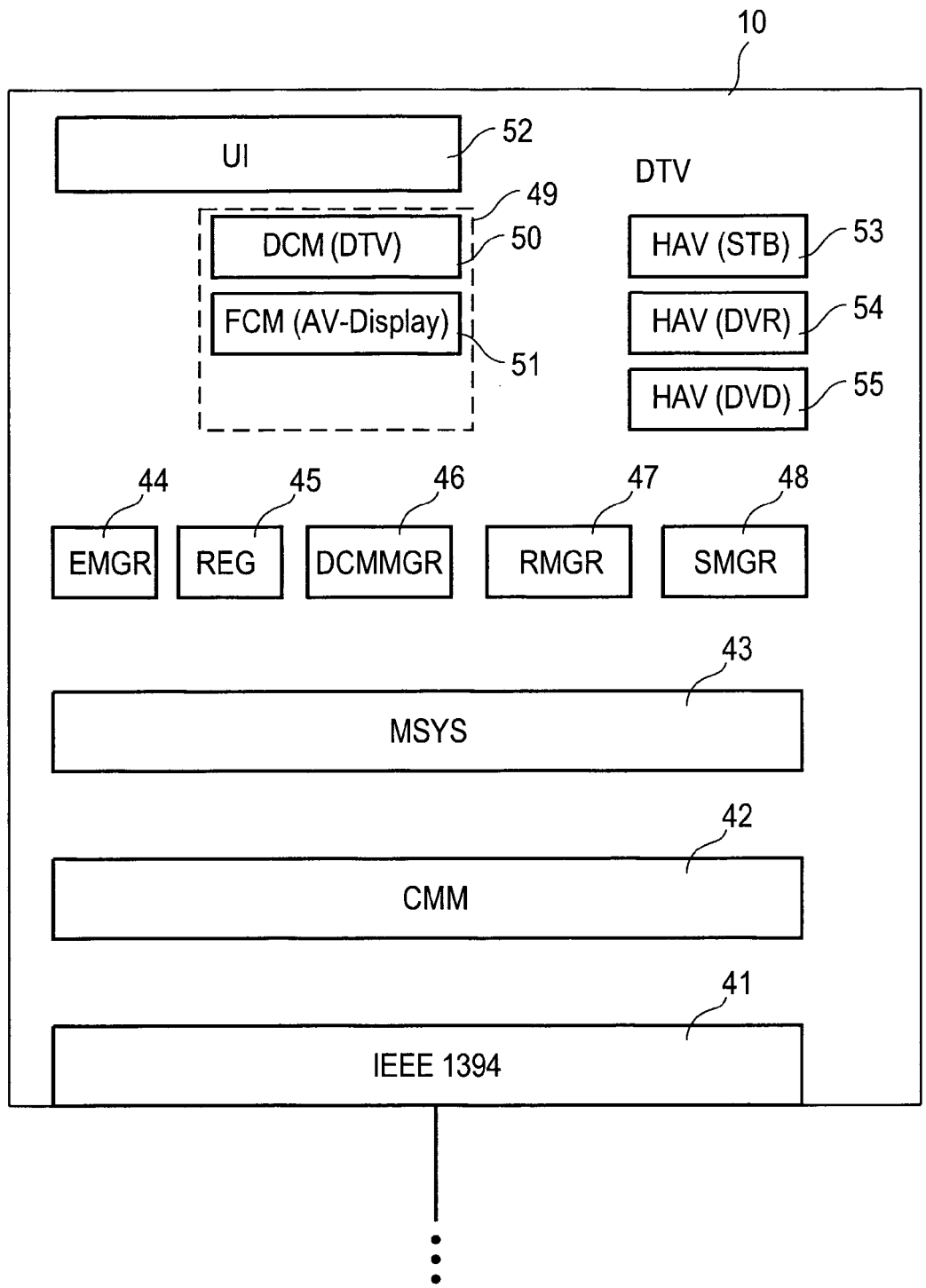
FIG. 8 shows the software components of a display appliance in the network.

The procedure for automatically setting up a connection is explained in more detail below for the HAVi network which is assumed here. In this case, FIG. 8 shows the software components of the digital television 10. As mentioned, this is a network designed on the basis of the HAVi standard. The HAVi specification has been published. It is currently at version 1.1. The exact title is: The HAVi specification "Specification of the Home Audio/Video interoperability (HAVi Architecture)", version 1.1, 15 May 2001. In order to disclose the invention, reference is therefore also made expressly to this HAVi specification.

Since not all of the components of the HAVi system are of importance in order to explain the present invention, the text below selectively explains only the fundamental components in more detail.

At the bottommost level of the HAVi software components (of the HAVi stack) the IEEE-1394 interface 41 is shown. This is typically not produced as a software component. Rather, the IEEE-1394 standard stipulates that both the physical layer and the data link layer need to be produced in hardware. Typically, two separate ICs are used for this. Above that, there is the "Communication Media Manager" 42 as a software component. This forms parts of the network layer and of the transport layer and forms an interface between the other software elements and the IEEE-1394 bus system.

Above the "Communication Media Manager" 42, there is the "Messaging System" 43. This component is a very important component in the HAVi standard, since the "Messaging System" is used whenever two different software modules want to interchange data with one another. The "Messaging System" is independent of the network and transport layers in the ISO/OSI reference model.

A further module in the HAVi stack is an "Event Manager" 44. The "Event Manager" 44 has the task of informing the various software elements in the network about changes/events which have occurred. Such events arise, in particular, whenever an appliance is added to the network or is removed from the network. A further software component in the HAVi stack is a "Registry" 45. The "Registry" contains a list of the available software elements in the network. The "Registry" provides the service of searching for particular software elements. A software element which wishes to communicate with other software elements in the network needs to have been registered in the "Registry".

A further software element in the HAVi stack is a "DCM Manager" 46. This has the task of installing the "DCM Code Units" for the respective network stations in FAV and IAV appliances. An FAV appliance ("Full Audio/Video Device") is equipped with the greatest number of HAVi software components. The particular feature is that an FAV appliance has also incorporated a "JAVA Virtual Machine". This means that the appliance is able to convert JAVA code into executable program code and then to execute it accordingly. An FAV appliance has the option of loading a "DCM Code Unit" from another HAVi network appliance. The "DCM Code Unit" is then installed in the FAV appliance next to the "DCM Code Unit" for the FAV appliance.

An IAV appliance ("Intermediate AV appliance") contains fewer software components than an FAV appliance.

The digital TV set 10 is considered to be an FAV appliance in the exemplary embodiment given.

The "Resource Manager" 47 has the task of monitoring whether particular resources in the network are still available for a respective requested task or whether they have already been allocated. It thus allocates appropriate resources to the application programs, provided that said resources are free.

As a further component, the HAVi stack also contains a "Stream Manager" 48. This is responsible for setting up connections between network subscriber stations. The connections which have been set up can then be used to transmit AV data streams.

Above the software elements in the HAVi stack which have been described up till now, there is also a "DCM Code Unit" 49 shown for the digital TV set 10. This comprises a DCM for the digital TV set 50 and an FCM (AV display). In this context, DCM stands for "Device Control Module" and FCM stands for "Functional Component Module". A DCM forms an interface for controlling the general functions of an appliance. If a network station provides different functionalities, such as a video recorder, which may have the functionality of a tuner and also of a recording appliance, then a "DCM Code Unit" will contain a number of the FCMs besides the DCM if appropriate. The HAVi standard itself specifies the functionalities of various types of FCMs. These include a "Tuner FCM", "VCR FCM", "Clock FCM", "Camera FCM", "AV-Disc FCM", "Amplifier FCM", "Display FCM", "AV-Display FCM", "Modem FCM" and "Web Proxy FCM".

As is shown, there is also a further software component 52 installed above the "DCM Code Unit" 49 in the digital TV set 10. This software component corresponds to the program for the user interface for appliance control in the network.

Besides this, likewise at the same level as the program for the user interface 52, "Havlets" 53 to 55 are installed. A Havlet is a piece of JAVA bytecode which a network appliance contains in stored form. This JAVA bytecode can be loaded from an FAV appliance in the network. In practice, it represents an application program which is made available to the FAV appliance in order to be able to control the corresponding network appliance. Hence, it is possible for a hitherto unknown network appliance to be controlled in a full functional scope by an HAVi-FAV appliance. The reference numeral 53 denotes the Havlet for controlling the set-top box 11. The reference numeral 54 denotes the Havlet for controlling the digital video recorder 12. Finally, the reference numeral 55 denotes the Havlet for controlling the DVD player 13.

Figure 9:
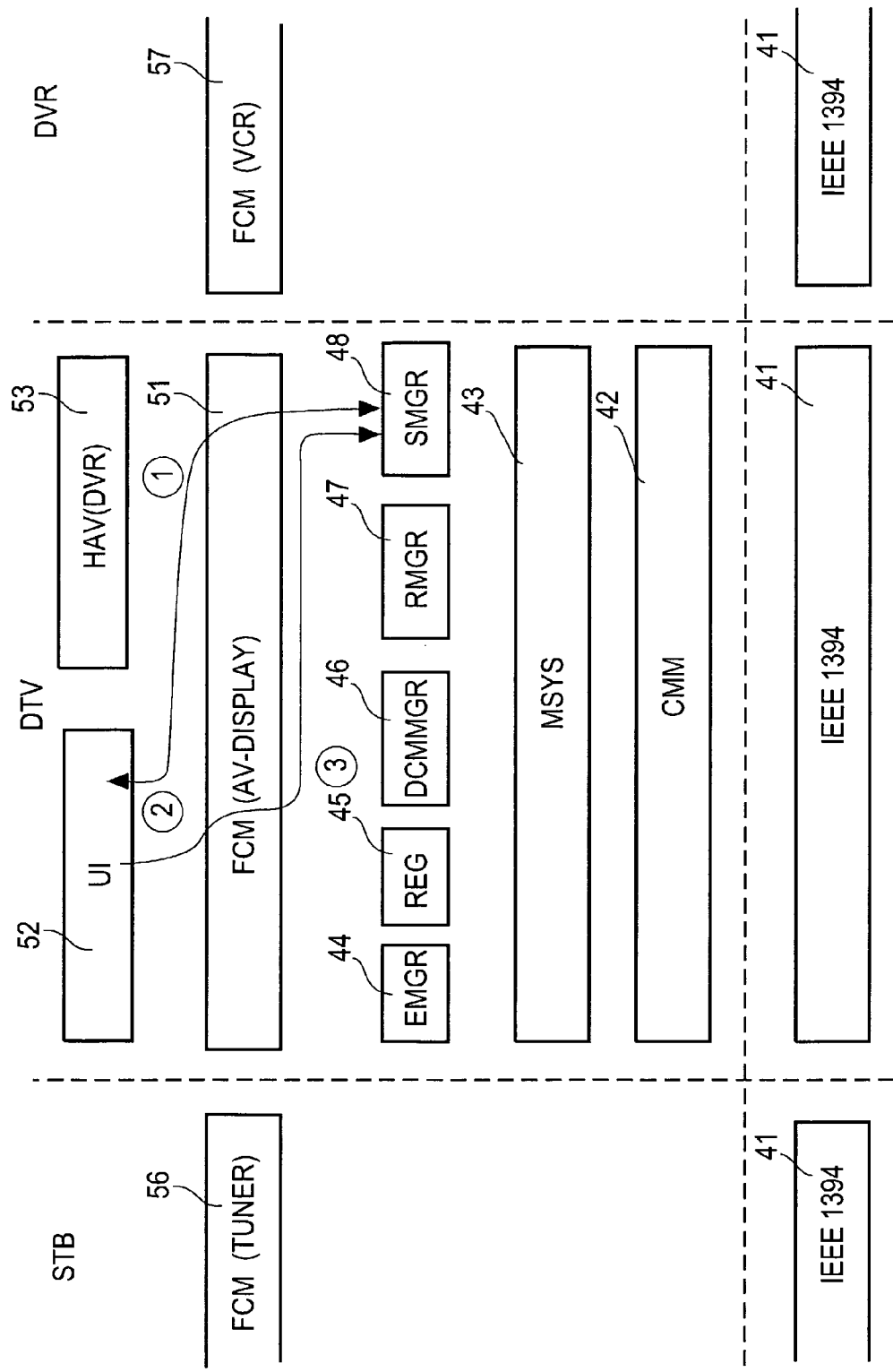
FIG. 9 shows the interaction between the software components of the network stations during automatic connection set-up based on the invention.

FIG. 9 shows the software components of the appliances involved in the automatic connection set-up shown in FIG. 3. The same reference numerals denote the same components as in FIG. 8. The two network stations involved—set-top box 11 and video recorder 12—are designed as BAV appliances. They lack the runtime environment for JAVA bytecode and also the further HAVi software components of Resource Manager, Stream Manager, DCM Manager, Registry, Event Manager, Messaging System and Communication Media Manager. They likewise do not have a program at application program level for providing a user interface for a network appliance. They have a respective DCM Code Unit for the set-top box and for the digital video recorder, respectively, installed on them. However, in the case of the set-top box 11 only the "Tuner-FCM" 56 and in the case of the digital video recorder 12 only the "VCR-FCM" 57 have been shown from this DCM Code Unit. This serves to simplify the drawing and to increase clarity.

To set up and to terminate a data connection in the network, the software component "Stream Manager" 48 is responsible in line with the HAVi specification. A connection is always set up between two FCMs. The starting point for a data connection is thus an FCM and the terminal point is another FCM. The HAVi standard distinguishes between external and internal connections. An internal connection exists between FCMs which are installed in an appliance. FCMs which are in different network stations are thus connected by means of external data connections. In the case of the exemplary embodiment shown in FIG. 9, the starting point for the connection is thus the "Tuner-FCM" 56 and the terminal point for the connection is the "VCR-FCM" 57.

As described above, in the exemplary embodiment shown in FIG. 2 there was already a data connection between the set-top box 11 and the digital TV set 10. Following selection of the user interface for the digital video recorder 12, the data connection between the set-top box 11 and the digital video recorder 12 is set up automatically, see FIG. 3, FIG. 4 and FIG. 5. In this case, the subsequent software components interact. The user interface for the digital video recorder 12 is selected under the control of the program for generating the user interface 52 in the digital TV set 10. When the user interface for the digital video recorder 12 has been selected, the user interface program 52 sends a request to the local "Stream Manager" 48 in the digital TV set 10 via the local data connections which have been set up to the digital TV set 10, see step ①. In this regard, the "Stream Manager" 48 provides the service StreamManager::GetGlobalConnectionMap. The response is obtained by the user interface program 52 in step ②. Furthermore, the response contains all existing data connections in the network. The user interface program checks whether there is a data connection to the digital TV set 10. If this is the case, an order is sent to the "Stream Manager" 48 in the digital TV set 10 in step ③ under the control of the user interface program 52. This is possibly done using the "Messaging System" 43 in the digital TV set. This order indicates that a new data connection needs to be set up between the set-top box 11 and the digital video recorder 12.

To this end, the Stream Manager Service StreamManager::FlowTo is called up, which can be used to set up a point-to-point connection between two FCMs. The Stream Manager 48 sets up the connection to the "Tuner-FCM" 56 in the set-top box 11 and VCR-FCM 57 in the digital video recorder. This is done by setting "Plug Register entries" in defined fashion. This is specified in the HAVi standard. To set up the connection completely, it may be necessary for the "Stream Manager" to call up further services in order to set up the "Stream(s)". This practice is stipulated in the HAVi standard and therefore does not need further explanation at this point.

When the new data connection has been set up, the user interface program 52 transfers control to the Havlet for the digital video recorder 53. The display accordingly changes to the user interface/operating menu for controlling the digital video recorder, as shown in FIG. 5. If the user now selects the representation for the record key 26, the Havlet 53 sends an appropriate command to the "VCR-FCM" 57 and recording is started. Since the data connection has already been set up in the step beforehand, the data received via it can be recorded immediately after the recording function has been activated.

Set-up of the data connection only after the recording functionality has been selected, as shown in FIGS. 6 and 7, may be implemented such that set-up of the connection directly after the recording function has been called up is programmed into the Havlet itself.

A further option is for the data connection to be set up under the control of the Havlet, but directly after the Havlet has actually started but before recording is started.

Figure 10:
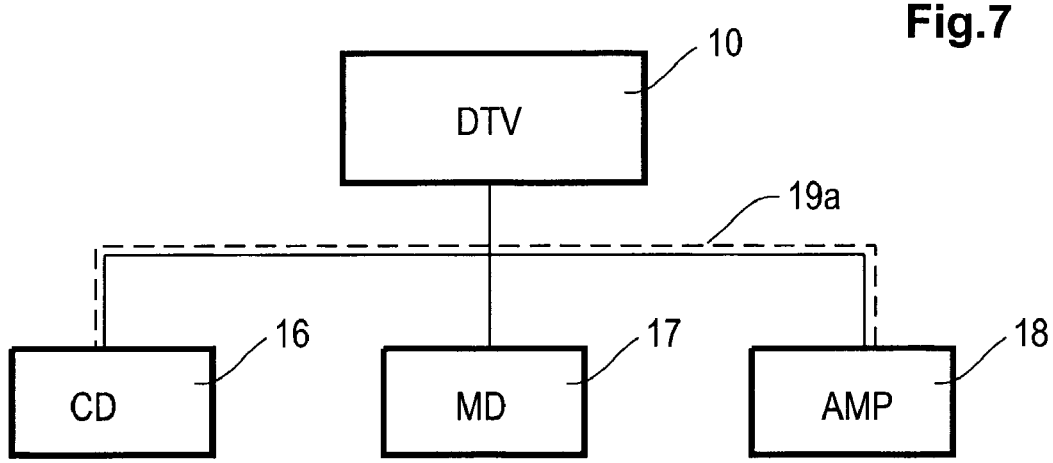
FIG. 10 shows a second example of a home network with a data connection which has been set up.

FIG. 10 shows yet a further exemplary embodiment of the invention. In this figure, the reference numeral 16 denotes a CD player. The reference numeral 17 denotes a minidisc player. The reference numeral 18 denotes an amplifier device for audio signals. FIG. 10 also shows a data connection 19a which has been set up between the CD player 16 and the amplifier device 18.

Figure 11:
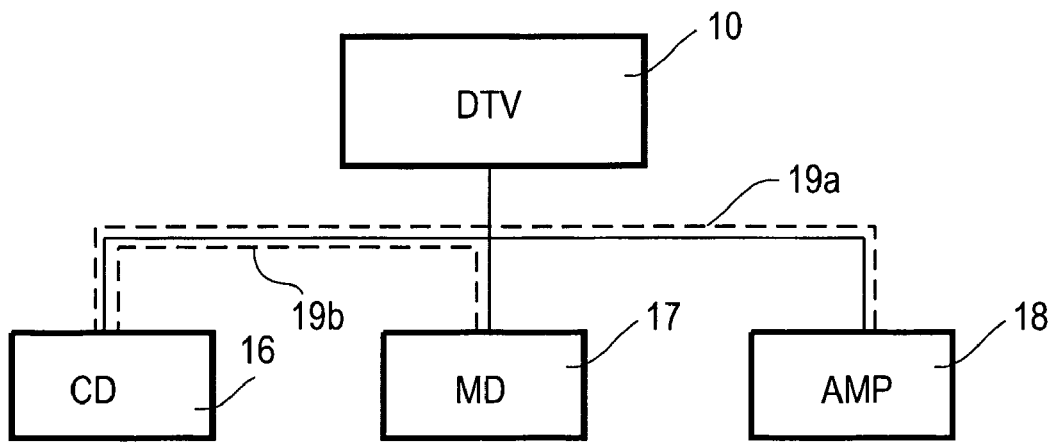
FIG. 11 shows the home network shown in FIG. 10 following automatic set-up of the data connection between the source data appliance and the recording appliance.

If the user interface for controlling the minidisc player 17 is now called up on the digital TV set 10, a data connection is automatically set up between the CD player 16 and the minidisc player 17. This is shown in FIG. 11. The data connection which has just been set up is denoted by the reference numeral 19b in that case. The inventive concept is likewise realized here. In the instance of application, the MD player 17 is used as a recording appliance for audio signals. The CD player 16 is used as a data source appliance for audio signals. Since there is already a connection existing to the amplifier unit 18, it is assumed that the user wishes to start recording from this data source. He then merely needs to start the recording function in the operating menu for controlling the minidisc player 17. It is not necessary to set up the data connection manually. An instant-recording function is thus likewise implemented for recording audio signals. This solution can be used in particularly appropriate fashion when the network contains no more than one data connection between an audio data source appliance and an audio data sink appliance. Otherwise, the user should make a selection beforehand.

It goes without saying that the embodiment already modified previously for setting up the data connection may likewise be implemented automatically only after the recording function has been selected.

The invention is not limited to the exemplary embodiments described above. It is not absolutely necessary for an IEEE-1394 bus system to be used for networking the appliances. By way of example, it is likewise possible to use a wireless bus connection between the appliances as well.

Following automatic connection set-up, the user may additionally be provided with a respective correction option, for the case in which the user does not actually wish to record from the data source to which the connection was automatically set up. He should then be able to select another data source manually.

The invention claimed is:

1. Method for automatically setting up data connections between network subscriber stations in a network of distributed stations, where the network contains at least one recording appliance, a data source appliance and a data sink appliance, comprising the following steps:
 user-activated selection of a user interface for the recording appliance on a user interface appliance;
 source
 checking for an existing digital data streaming connections which has been set up for the data sink appliance or the user interface appliance in the network;
 identifying via the user interface the data source appliance in the network that is streaming said digital data over the existing digital data connection to the data sink appliance station;
 automatically setting up a point-to-point connection between the data source appliance, for which a connection to the data sink appliance or to the user interface appliance has been set up, and the recording appliance in order to assist in the implementation of an instant-recording function on the recording appliance upon selection of a recording function,
 wherein the recording appliance starts recording the digital data stream coming from the data source appliance after the new point-to-point connection has been established, and said appliances are linked and communicate said streamed digital data to each other only through a common bus that is at least one of; wired and wireless.

2. Method according to claim 1, wherein the data connection between the data source appliance and the recording appliance is set up only after the recording function on the recording appliance has been activated by the user.

3. Method according to claim 1, wherein the user interface appliance is a display appliance for video images, and the user interface is based on a graphical user interface.

4. Method according to claim 1, wherein the data sink appliance is an amplifier device for audio signals.

5. Method according to claim 1, wherein the recording appliance is a digital video recorder or a digital audio recorder.

6. Network subscriber station as a user interface appliance for carrying out the method according to claim 1, having a program means for providing user interfaces for controlling network subscriber stations, wherein the user interface appliance has further program means which, upon activation of the user interface for the control of a recording appliance in the network by the user, calling up checking program means which triggers a check regarding the existing data connections which have been set up for a data sink appliance or the user interface appliance itself and upon selection of the recording function in the user interface for the control of the recording appliance automatically calling up a connection establishing means which sets up a point-to-point connection between the data source appliance, for which a data connection to the data sink appliance or to the user interface appliance has been set up, and the recording appliance in order to assist in the implementation of an instant-recording function on the recording appliance in the network.

7. Network subscriber station according to claim 6, wherein the further program means are designed such that they set up the data connection between the data source appliance and the recording appliance in the network only after the recording function on the recording appliance has been activated by the user.

8. Network subscriber station according to claim 6, wherein the user interface appliance is a display appliance for video images, and the user interface is based on a graphical user interface.

9. Network subscriber station according to claim 6, wherein the data sink appliance is an amplifier device for audio signals.

10. Network subscriber station according to claim 6, wherein the recording appliance is a digital video recorder or a digital audio recorder.

* * * * *